US012809516B2

(12) United States Patent
Manchanapura et al.

(10) Patent No.: US 12,809,516 B2
(45) Date of Patent: Nov. 24, 2026

(54) PROXY CONTROLLER IN A STORAGE NETWORK

(71) Applicant: Hewlett Packard Enterprise Development LP, Spring, TX (US)

(72) Inventors: Chandrashekar Chikkalingaiah Manchanapura, Bangalore (IN); Krishna Babu Puttagunta, Rocklin, CA (US); Prateek Sarnad, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 6 days.

(21) Appl. No.: 18/928,453

(22) Filed: Oct. 28, 2024

(65) Prior Publication Data

US 2026/0037123 A1 Feb. 5, 2026

(30) Foreign Application Priority Data

Aug. 4, 2024 (IN) ............................ 202411058849

(51) Int. Cl.
*G06F 12/00* (2006.01)
*G06F 3/06* (2006.01)

(52) U.S. Cl.
CPC .......... *G06F 3/0605* (2013.01); *G06F 3/0659* (2013.01); *G06F 3/067* (2013.01)

(58) Field of Classification Search
CPC ..... G06F 3/0604; G06F 3/0607; G06F 3/0659
USPC .......................................................... 711/154
See application file for complete search history.

(56) References Cited

U.S. PATENT DOCUMENTS

| | | | | |
|---|---|---|---|---|
| 11,194,506 | B1 * | 12/2021 | Proulx | G06F 3/0655 |
| 2008/0299969 | A1 * | 12/2008 | Shatsky | H04W 60/06 455/435.1 |
| 2009/0144360 | A1 * | 6/2009 | Wada | H04L 47/10 709/203 |
| 2011/0090870 | A1 * | 4/2011 | Ronneke | H04W 76/27 370/331 |
| 2012/0147784 | A1 * | 6/2012 | Guo | H04L 67/1097 370/254 |
| 2020/0177486 | A1 * | 6/2020 | Bisht | H04L 41/083 |
| 2021/0263686 | A1 | 8/2021 | Satapathy et al. | |
| 2022/0300176 | A1 * | 9/2022 | Smith | G06F 3/0659 |
| 2024/0020059 | A1 * | 1/2024 | Paulchamy | G06F 3/0659 |
| 2025/0023893 | A1 * | 1/2025 | Sumedrea | G06Q 30/0201 |

(Continued)

OTHER PUBLICATIONS

Broadcom, "Proxy Devices," Jan. 12, 2024, Brocade® Fabric OS® Administration Guide, 9.1.x, <https://techdocs.broadcom.com/us/en/fibre-channel-networking/fabric-os/fabric-os-administration/9-1-x/v26765667/v26766098/v26766785.html>, pp. 1-2.

(Continued)

*Primary Examiner* — Mohamed M Gebril
(74) *Attorney, Agent, or Firm* — Trop, Pruner & Hu, P.C.

(57) ABSTRACT

Example implementations relate to storage networks. In some examples, a proxy controller may identify all devices included in the storage network, and may identify a first subset of the storage devices that were previously registered with a central controller of the storage network. The proxy controller may also determine a second subset of the storage devices that were not previously registered with the central controller, and may register the second subset of the storage devices on the central controller of the storage network.

20 Claims, 7 Drawing Sheets

(56) References Cited

U.S. PATENT DOCUMENTS

| | | | | |
|---|---|---|---|---|
| 2025/0097269 | A1 * | 3/2025 | Singal | H04L 63/20 |
| 2025/0274513 | A1 | 8/2025 | Puttagunta et al. | |
| 2025/0293875 | A1 | 9/2025 | Malkin et al. | |

OTHER PUBLICATIONS

Cisco Systems, Inc., "Fibre Channel Zoning," Jan. 6, 2023, Cisco UCS Manager Storage Management Guide, Release 4.2, < https://www.cisco.com/c/en/us/td/docs/unified_computing/ucs/ucs-manager/GUI-User-Guides/Storage-Mgmt/4-2/b_UCSM_GUI_Storage_Management_Guide_4_2/b_UCSM_GUI_Storage_Management_Guide_chapter_0100.html>, pp. 1-10.

Cisco Systems, Inc., "Managing FLOGI, Name Server, and RSCN Databases," Jun. 11, 2024, Cisco MDS 9000 Family Configuration Guide, Release 1.0(2), Chapter 13, <https://web.archive.org/web/20240611112035/https://www.cisco.com/en/US/docs/storage/san_switches/mds9000/sw/rel_1_x/1_0_2/san-os/configuration/guide/MgngStorDevc.html>, 8 Pages.

Erik Smith, "Automating the discovery of NVME-oF subsystems over an IP Network," Sep. 2021, pp. 1-43.

Juniper Networks, Inc., "Understanding an FCoE-FC Gateway," Nov. 23, 2023, <https://web.archive.org/web/20240519174054/https://www.juniper.net/documentation/us/en/software/junos/storage/topics/concept/fibre-channel-fcoe-to-fc-proxy-gateway-understanding.html>, pp. 1-5.

Mazurek et al., "Fibre Channel Zoning Basics," Jun. 2019, Fibre Channel Industry Association, pp. 1-43.

NVM Express Workgroup, "NVM ExpressTM over Fabrics," Revision 1.1a, Specification, Jul. 12, 2021, pp. 1-84.

Phil Clayton, "NVM Express State of the Union," Sep. 4, 2024, pp. 1-18.

Sun Microsystems, Inc., "SAN Fundamentals: How Fibre Channel SANs Are Built, Secured and Managed," Apr. 2007, pp. 1-26.

* cited by examiner

PROXY CONTROLLER IN A STORAGE NETWORK

BACKGROUND

A computing system may include compute nodes and storage devices coupled via network links. Each compute node may be a computing device that can access the data stored in the storage devices. In some examples, the compute nodes and storage devices may be used as a group to provide functionality and redundancy for a distributed environment.

BRIEF DESCRIPTION OF THE DRAWINGS

Some implementations are described with respect to the following figures.

Figure 1A:
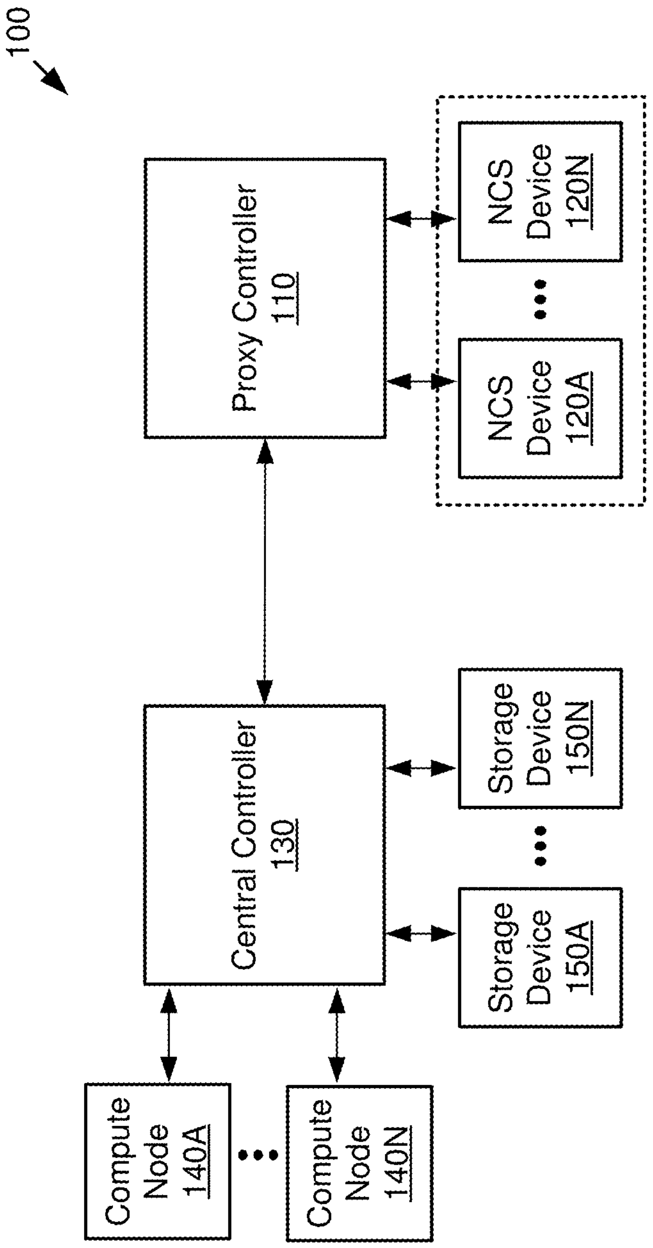
FIGS. 1A-1C are schematic diagrams of an example storage network, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a storage network system may include compute nodes and storage devices (also referred to as "network devices) coupled via network links (also referred to as a "network fabric"). For example, such network links may be implemented using the Non-Volatile Memory Express over Fabrics (NVMe-oF) protocol. In some examples, the network devices may include physical storage devices, physical compute nodes, physical switch devices, virtual storage devices, virtual compute nodes, virtual switch devices, or any combination thereof. A storage device may include or manage any number of storage components to persistently store data. For example, a storage device may be a controller for a storage array including multiple non-volatile storage drives. A compute node may be a computing device (e.g., a server, controller, etc.) that can access the data stored in the storage devices.

In some examples, the storage network system may include a central controller that uses a management protocol to discover and manage network devices. For example, the central controller may be a Centralized Discovery Controller (CDC) that provides management of CDC-compliant devices in an NVMe-OF network system. In some examples, the central controller may automatically discover and register network devices. Further, the central controller may allocate or assign the network devices into different groups or "zones" to provide data privacy and/or security. The zones may be defined by access rules (also referred to herein as "zone rules") that specify how data may be accessed in the zones. The zone rules may prevent devices from communicating with and/or accessing the devices in a different zone. Furthermore, the central controller may provide messaging to notify compute nodes of the available storage devices, and to allow the compute nodes to establish links to various storage devices.

In some examples, the central controller may automatically manage only those network devices that are compliant with (e.g., implement) the management protocol of the central controller. In such examples, if the storage network system includes any non-compliant network devices (i.e., network devices that are not capable of using the management protocol), the central controller may not be able to automatically discover or configure those non-compliant network devices. Accordingly, in some examples, adding non-compliant network devices to the storage network system may involve manually performing management tasks (e.g., establish links between compute nodes and storage devices, updating links, etc.), and may therefore require significant amounts of manual effort and time.

As described further below with reference to FIGS. 1A-6, some implementations may include a proxy controller to automatically discover non-compliant network devices in a storage network system, and to allow the central controller to perform management tasks using the discovered non-compliant devices. The proxy controller may query the central controller to obtain a list of all registered storage devices (i.e., storage devices that were previously registered with the central controller). The proxy controller may also perform a poll or scan to identify all storage devices present in the storage network, and may then identify the non-compliant storage devices as the subset of the storage devices that were not previously registered with the central controller. The proxy controller may collect configuration information from the non-compliant storage devices. Further, the proxy controller may register itself with the central controller as a single network device that appears to include the non-compliant storage devices (e.g., as components or subsystems of the proxy controller). The non-compliant storage devices may then be included in the configurations (e.g., zone rules) generated by the central controller. In this manner, the proxy controller may automatically discover and configure the non-compliant storage devices in the storage network system.

FIGS. 1A-IC—Example Network System

FIG. 1A shows an example of a network system 100, in accordance with some implementations. The network system 100 may include a proxy controller 110 and a central controller 130. The central controller 130 may be coupled, via network links, to a set of compute nodes 140A-140N (also referred to as "compute nodes 140") and storage devices 150A-150N (also referred to as "storage devices 150"). The compute nodes 140 and storage devices 150 may be referred to herein as "registered devices" or "registered clients" of the central controller 130. Each compute node 140 may be a computing device or host (e.g., a computer server including a processor, memory, and persistent storage). Further, each storage device 150 may be all or part of a storage device (e.g., storage subsystem, storage controller, storage array, hard disk drive(s), solid state drive(s), optical disk(s), and so forth) that is compliant with the central controller 130 (i.e., is capable of using the management protocol of the central controller 130). A "link" can refer to a communication medium (wired and/or wireless) over which devices can communicate with one another.

In some implementations, the central controller 130 may use or implement a device management protocol to discover and manage devices in the network system 100. For example, the central controller 130 may be a Centralized Discovery Controller (CDC) that performs device management (e.g., auto discovery, name services, zoning, fabric notifications, etc.) of CDC-compliant devices in an NVMe-OF network system. The central controller 130 may automatically discover and register compliant network devices. As used herein, the term "compliant device" may refer to a device in a network system that are compliant with (e.g., implement) the device management protocol used by a central controller of the network system. Further, the central controller may allocate or assign the compliant network devices into different zones to provide data privacy and/or security. An example implementation of the central controller 130 is described below with reference to FIG. 1B.

In some implementations, the network system 100 can be configured for a particular task or purpose. For example, in some implementations, the network system 100 may be a Storage Area Network (SAN) implementing one or more network protocols (e.g., the NVMe-oF protocol, the Internet Small Computer Systems Interface (iSCSI) protocol, and so forth). Although FIG. 1A shows an example implementation of the network system 100, other implementations are possible. For example, it is contemplated that the network system 100 may include additional devices and/or components, fewer components, different components, different arrangements, and so forth.

Figure 1B:
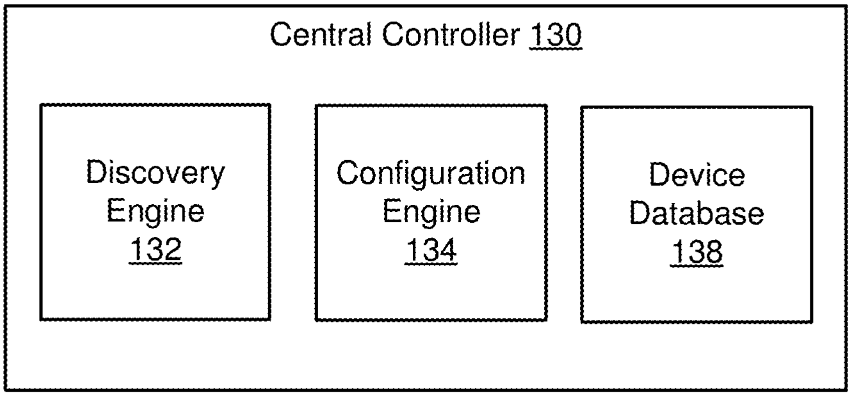

Referring now to FIG. 1B, shown is an example implementation of a central controller 130. In some implementations, the central controller 130 may include a discovery engine 132, a configuration engine 134, and a device database 138. Some or all of the engines 132, 134 may be implemented via hardware (e.g., electronic circuitry), or via a combination of hardware and programming (e.g., comprising at least one processor and instructions executable by the at least one processor). In implementations using executable instructions, such instructions may be stored in machine-readable storage media, in hardware (e.g., circuitry), and so forth. Although FIG. 1B shows an example in which the engines 132, 134 are implemented in a single central controller 130, in other examples, the engines 132, 134 may be implemented in distinct devices or services. Further, it is contemplated that the central controller 130 may include additional devices and/or components, fewer components, different components, different arrangements, and so forth.

In some implementations, the discovery engine 132 may automatically perform discovery and registration of compatible devices in the network system 100. Further, the device database 138 may be a data structure to store information regarding each of the discovered compatible devices. Such information may include device identifiers, device configuration, storage configuration, namespaces, data locations, network connections, status, performance, and so forth.

In some implementations, the discovery engine 132 may obtain the discovery information via a registration process initiated by the compatible devices. For example, when a new compatible storage device 150 is added to the network system 100, the storage device 150 may discover (e.g., via a search function) the central controller 110, and may initiate a registration with the central controller 130 (via the discovery engine 132). Further, upon registering the new storage device 150, the discovery engine 132 may add an identifier (and other information) for the new compatible storage device 150 to the device database 138. However, in other implementations, the discovery engine 132 may obtain the discovery information by polling the network devices in the network system 100.

In some implementations, the configuration engine 134 may provide configuration of zones in the network system 100. For example, the configuration engine 134 may receive user inputs or commands to specify zone rules, where each zone rule identifies a subset of devices that can communicate with each other (also referred to herein as a "zone").

Referring again to FIG. 1A, in some implementations, the network system 100 (also referred to as "storage network 100") may include any number of non-compliant storage (NCS) devices 120A-120N (also referred to as "NCS device 120"). As used herein, a "non-compliant" device (also referred to as a "non-capable," "non-compatible," "inept," or "unsupported" device) may refer to a device in a network system that is not compliant with (or does not implement) the device management protocol used by a central controller of the network system. As such, the NCS devices 120 may not be directly discovered or configured by the central controller 130 alone.

Figure 1C:
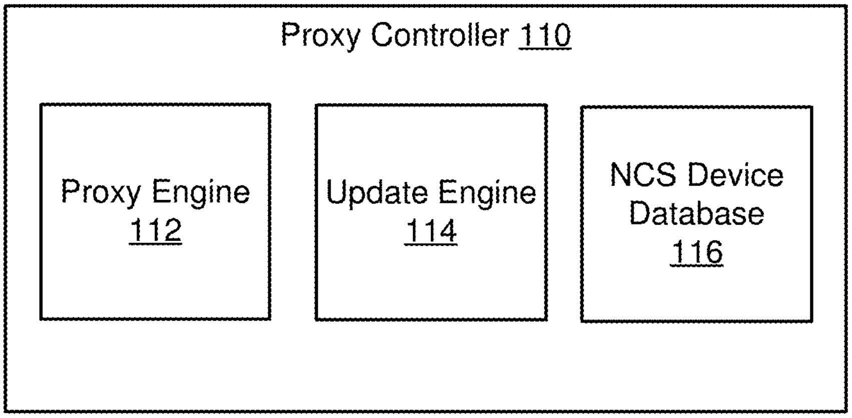

Referring now to FIG. 1C, shown is an example implementation of a proxy controller 110. In some implementations, the proxy controller 110 may include a proxy engine 112, an update engine 114, and a non-compliant storage (NCS) device database 116. Some or all of the engines 112, 114 may be implemented via hardware (e.g., electronic circuitry), or via a combination of hardware and programming (e.g., comprising at least one processor and instructions executable by the at least one processor). In implementations using executable instructions, such instructions may be stored in machine-readable storage media, in hardware (e.g., circuitry), and so forth. Although FIG. 1C shows an example in which the engines 112, 114 are implemented in a single proxy controller 110, in other examples, the engines 112, 114 may be implemented in distinct devices or services. Further, it is contemplated that the proxy controller 110 may include additional devices and/or components, fewer components, different components, different arrangements, and so forth.

In some implementations, the proxy engine 112 may be executed or used to initially discover and configure the NCS devices 120 in the network system 100. Upon initiation or startup, the proxy engine 112 may query the central controller 130 to obtain a list of all registered storage clients of the central controller 130 (e.g., the storage devices 150). The proxy controller 110 may also perform a poll or scan to identify all storage devices present in the network system 100, and may then identify the NCS devices 120 as the subset of the storage devices that were not previously registered with the central controller 130. The proxy engine 112 may collect device configuration information from the NCS devices 120, and may generate or update the NCS device database 116 based on the collected information. In some implementations, the NCS device database 116 may be a data structure to store the collected information regarding the most-recently determined set of NCS devices 120. Such collected information may include device identifiers, device configuration, storage configuration, namespaces, data locations, network connections, status, performance, and so forth.

In some implementations, the proxy engine 112 may register itself, on the central controller 130, as a proxy storage device that includes the NCS devices 120. As used herein, a "proxy storage device" may be a registered form or representation of the proxy controller 110 that is viewed by the central controller 130 as a single storage device that includes the NCS devices 120 as subsystems. For example, the central controller 130 may interact with (e.g., configure) the registered proxy controller 110 in the same manner as a registered storage device 150, and may interact with the NCS devices 120 as components or "subsystems" of the registered proxy controller 110. In this manner, the NCS devices 120 may be included in management operations of the central controller 130 (e.g., configuration, discovery, and so forth). An example process for initiating a proxy controller is described below with reference to FIG. 2.

In some implementations, the update engine 114 may determine a set of changes to the NCS devices 120, and may update the proxy controller 110 based on the determined set of changes to the NCS devices 120. The update engine 114 may generate an updated list of NCS devices 120 (e.g., by again querying the central controller 130 for the list of registered clients, and scanning to identify all storage devices), and may compare the updated list of NCS devices 120 to the NCS device database 116 (i.e., including the previous list of NCS devices 120). Based on this comparison, the update engine 114 may identify the changes of the NCS devices 120 (e.g., new devices, removed devices, modified devices, and so forth), and may update the proxy controller 110 to manage the modified set of NCS devices 120. Further, the update engine 114 may update the NCS device database 116 to include the updated list of NCS devices 120 (e.g., by replacing the previous list). An example process for updating the proxy controller 110 is described below with reference to FIG. 3.

Note that, in the example shown in FIG. 1A, the proxy controller 110 and the central controller 130 are illustrated as two separate physical devices. However, other implementations are possible. For example, it is contemplated that the proxy controller 110 and the central controller 130 may be implemented as virtualized components that are executed by a processor (or multiple processors). Further, the proxy controller 110 may be included in (or part of) the central controller 130. For example, the proxy controller 110 may be executed by the central controller 130 (e.g., as a daemon process, virtual machine, etc.). Other variations are possible.

Figure 2:
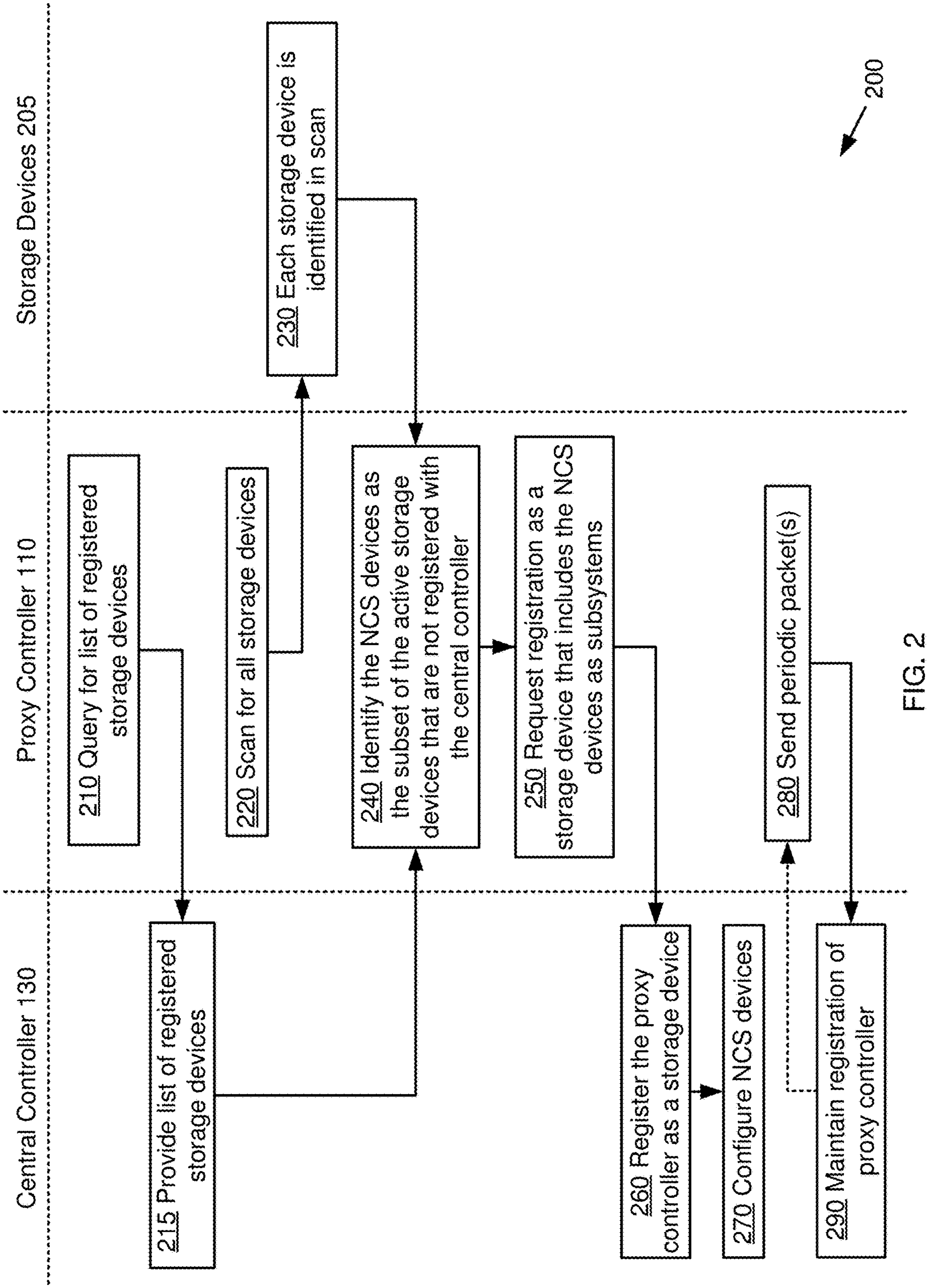
FIG. 2 is an illustration of an example process, in accordance with some implementations.

FIG. 2—Example Process for Initiating a Proxy Controller

FIG. 2 shows an example process 200 for initiating a proxy controller, in accordance with some implementations. For example, the process 200 may be performed during start-up or initialization of a storage network 100, central controller 130, and/or proxy controller 110 (shown in FIG. 1A). The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

As shown in FIG. 2, the process 200 may be performed by a central controller 130, a proxy controller 110, and a set of network devices 205 that are included in a network system. The network devices 205 may correspond generally to all of the compute nodes and storage devices shown in FIG. 1A (e.g., including the registered compute nodes 140, the registered storage devices, 150, and the non-compliant storage (NCS) devices 120).

At block 210, the proxy controller 110 may query the central controller 130 for a list of all storage devices that are registered with the central controller. At block 215, the central controller 130 may provide (or otherwise make available) the list of the registered storage devices to the proxy controller 110. In some implementations, the proxy controller 110 may request the list in the same (or similar) manner to a compute node requesting a list of storage devices from the CDC. For example, in implementations in which the central controller 130 is a Centralized Discovery Controller (CDC), the proxy controller 110 may obtain the list of all previously registered storage devices by sending an NVMe "Get Log Page" (or similar query) request to the CDC.

At block 220, the proxy controller 110 may initiate a scan or poll for all active storage devices 220 in the network system. At block 230, each active storage device 220 is identified in the scan performed by the proxy controller 110. Further, the active storage devices 220 may send (or provide access to) their respective configuration information to the proxy controller 110. For example, in implementations in which the central controller 130 is a CDC, the proxy controller 110 may use an "nmap" (or similar) command to identify the set of storage devices 220 that have active or open ports (e.g., to listen for incoming connections) on the network system. Further, the proxy controller 110 may obtain configuration information for the storage devices 220 by sending an NVMe "Get Log Page" (or similar query) request to each storage device 220.

At block 240, the proxy controller 110 may identify the non-compliant storage (NCS) devices as the subset of the active storage devices that are not registered with the central controller. For example, in some implementations, the proxy controller 110 may receive (from the central controller 130) a list of registered storage devices (e.g., storage devices 150 shown in FIG. 1A). Further, the proxy controller 110 may subtract the list of the registered storage devices from a list of all active storage devices (e.g., from the responses received from the storage devices 220), thereby generating a list of the NCS devices in the storage network.

At block 250, the proxy controller 110 may request registration with the central controller 130 as a storage device that includes the NCS devices as subsystems. At block 260, the central controller 130 may register the proxy controller 110 as a storage device. At block 270, the central controller 130 may configure the NCS devices as subsystems of the proxy controller 110. For example, in implementations in which the central controller 130 is a CDC, the proxy controller 110 registers itself with the CDC as a proxy storage device (or a discovery controller of a storage device) that includes the NCS devices as components or subsystems. Subsequently, the CDC may configure or manage the NCS devices (e.g., for auto discovery, name services, zoning, fabric notifications, etc.).

At block 280, the proxy controller 110 may send periodic packet(s) to the central controller 130. At block 290, the central controller 130 may maintain the registration of the proxy controller 110 (e.g., as a storage device that includes the NCS devices as subsystems) in response to receiving the periodic packet(s). For example, the central controller 130 may repeatedly communicate with its registered clients according to a time period or schedule, and may de-register any clients that fail to communicate with the central controller 130 according to specified parameters (e.g., a timeout period). In such examples, the proxy controller 110 may send periodic packets (also referred to herein as "keep-alive packets") to keep the proxy controller 110 and the NCS devices from being de-registered from the central controller 130.

Figure 3:
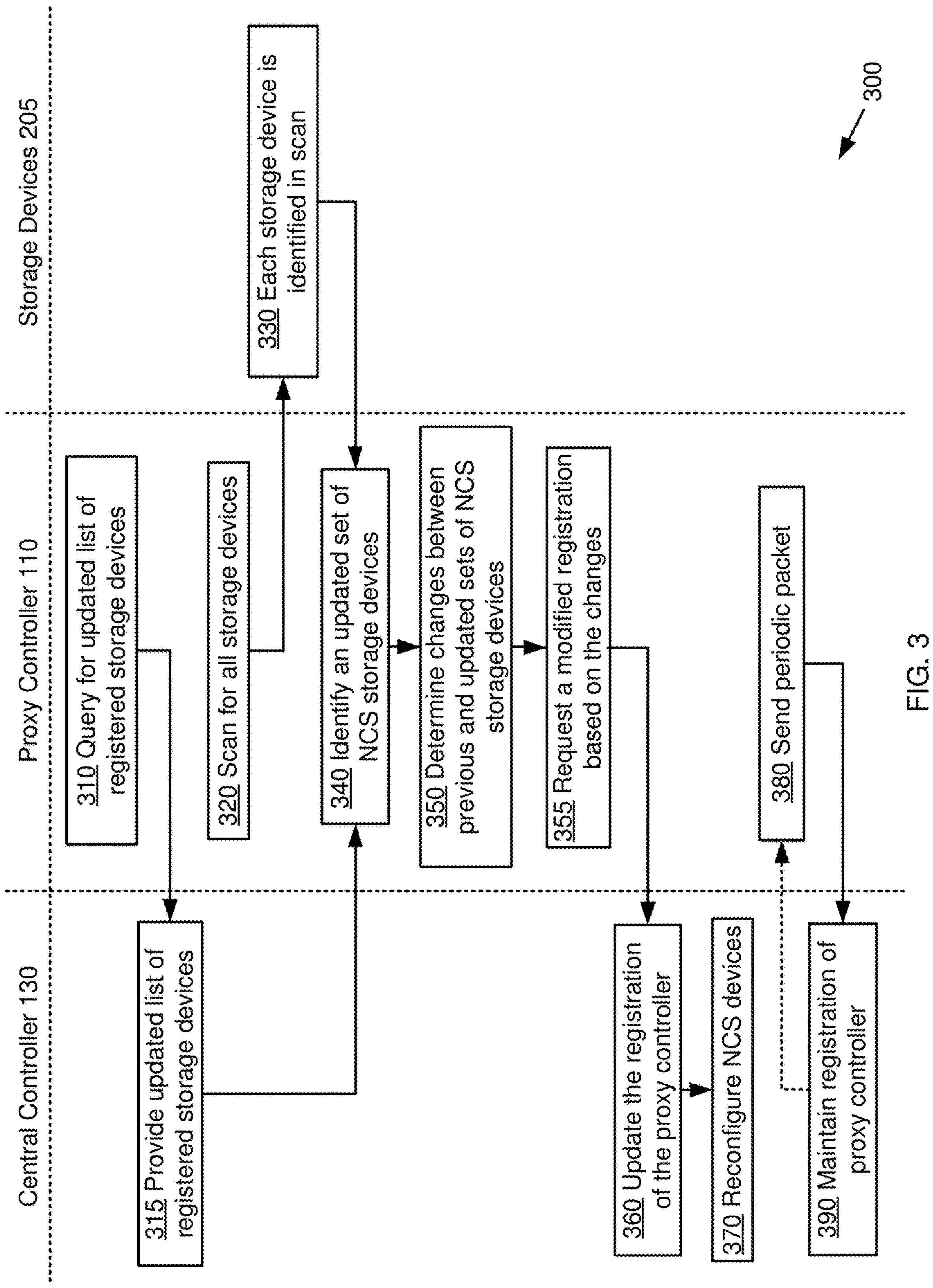
FIG. 3 is an illustration of an example process, in accordance with some implementations.

FIG. 3—Example Process for Updating a Proxy Controller

FIG. 3 shows an example process 300 for updating a proxy controller, in accordance with some implementations. For example, the process 300 may be performed in response to a change to an existing network system (e.g., subsequent to completing the process 200 shown in FIG. 2). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. As shown in FIG. 3, the process 300 may be performed by a central controller 130, a proxy controller 110, and a set of network devices 205 that are included in a network system.

At block 310, the proxy controller 110 may query the central controller 130 for an updated list of all storage devices that are registered with the central controller. At block 315, the central controller 130 may provide (or otherwise make available) the updated list of the registered storage devices to the proxy controller 110.

At block 320, the proxy controller 110 may initiate a new scan for all active storage devices 220 in the network system. At block 330, each active storage device 220 is identified in the scan performed by the proxy controller 110. Further, the active storage devices 220 may provide their respective configuration information to the proxy controller 110.

At block 340, the proxy controller 110 may identify an updated set of non-compliant storage (NCS) devices as the subset of the active storage devices that are not previously registered with the central controller. At block 350, the proxy controller 110 may determine the changes between the previous and updated sets of NCS devices.

At block 355, the proxy controller 110 may request a modified registration (with the central controller 130) based on the determined changes between the previous and updated sets of NCS devices. At block 360, the central controller 130 may update the registration of the proxy controller 110 as a proxy storage device. At block 370, the central controller 130 may reconfigure the NCS devices based on the determined changes.

At block 380, the proxy controller 110 may send periodic packet(s) to the central controller 130. At block 390, the central controller 130 may maintain the registration of the proxy controller 110 (e.g., as a storage device that includes the NCS devices as subsystems) in response to receiving the periodic packet(s).

Figure 4:
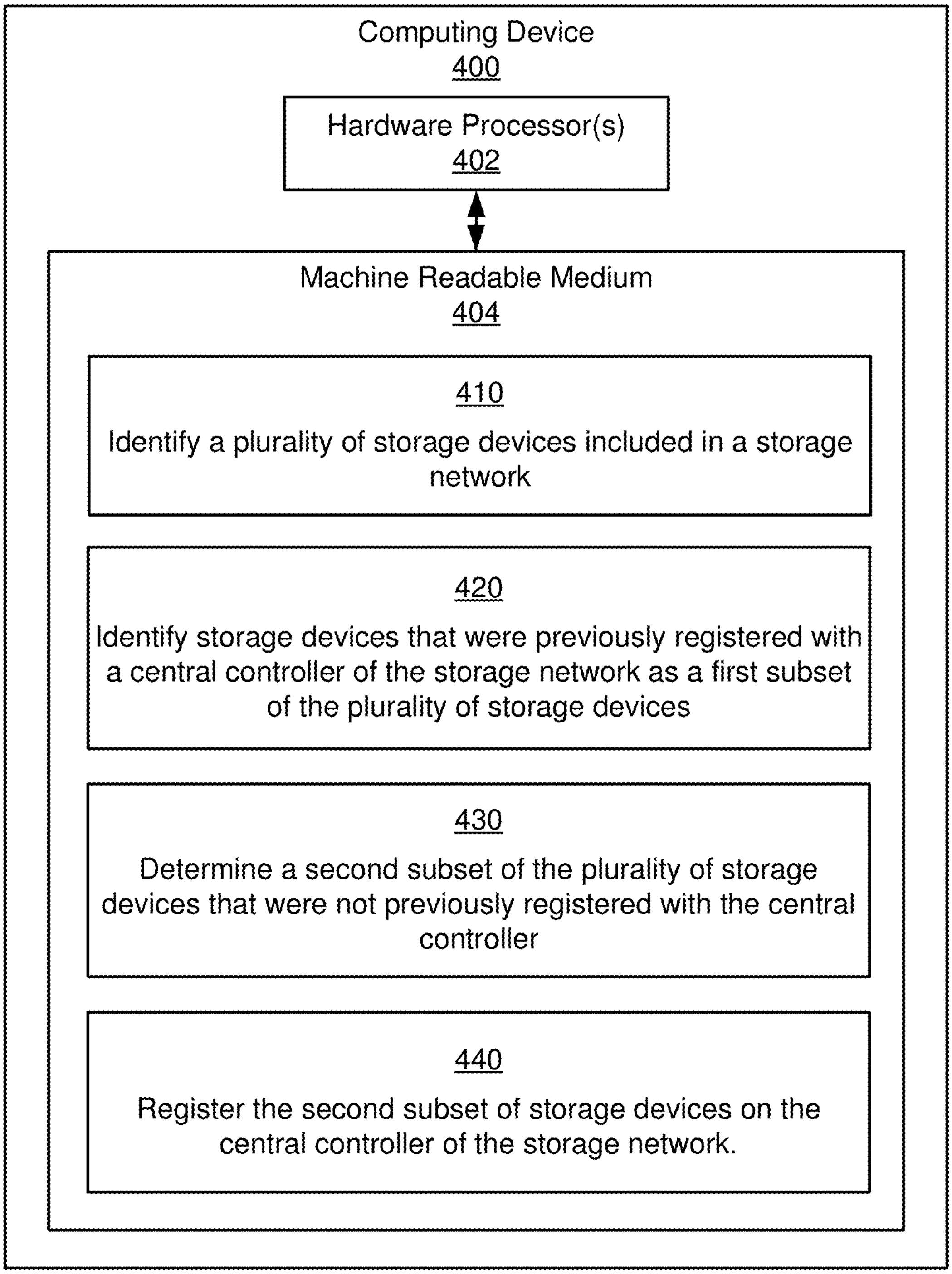
FIG. 4 is a schematic diagram of an example computing device, in accordance with some implementations.

FIG. 4—Example Computing Device

FIG. 4 shows a schematic diagram of an example computing device 400. In some examples, the computing device 400 may correspond generally to some or all of the proxy controller 110 (shown in FIGS. 1A and 1C). As shown, the computing device 400 may include a hardware processor 402 and machine-readable storage 405 including instructions 410-440. The machine-readable storage 405 may be a non-transitory medium. The instructions 410-440 may be executed by the hardware processor 402, or by a processing engine included in hardware processor 402.

Instruction 410 may be executed to identify a plurality of storage devices included in a storage network. For example, referring to FIG. 2, at block 220, the proxy controller 110 may initiate a scan or poll for all active storage devices 220 in the network system. At block 230, each active storage device 220 is identified in the scan performed by the proxy controller 110. Further, the active storage devices 220 may send their respective configuration information to the proxy controller 110. In some implementations in which the central controller 130 is a CDC, the proxy controller 110 may use an "nmap" command to identify the set of storage devices 220 that have active or open ports (e.g., to listen for incoming connections) on the network system. Further, the proxy controller 110 may obtain configuration information for the storage devices 220 by sending an NVMe "Get Log Page" request to each storage device 220

Referring again to FIG. 4, instruction 420 may be executed to identify storage devices that were previously registered with a central controller of the storage network as a first subset of the plurality of storage devices. For example, referring to FIG. 2, at block 210, the proxy controller 110 may query the central controller 130 for a list of all storage devices that are registered with the central controller. At block 215, the central controller 130 may provide the list of the registered storage devices to the proxy controller 110. In some implementations, the proxy controller 110 may request the list in the same (or similar) manner to a compute node requesting a list of storage devices from the CDC. For example, in implementations in which the central controller 130 is a Centralized Discovery Controller (CDC), the proxy controller 110 may obtain the list of all previously registered storage devices by sending an NVMe "Get Log Page" (or similar query) request to the CDC.

Referring again to FIG. 4, instruction 430 may be executed to determine a second subset of the plurality of storage devices that were not previously registered with the central controller. For example, referring to FIG. 2, at block 240, the proxy controller 110 may identify the non-compliant storage (NCS) devices as the subset of the active storage devices that are not registered with the central controller. In some implementations, the proxy controller 110 may receive (from the central controller 130) a list of registered storage devices (e.g., storage devices 150 shown in FIG. 1A). Further, the proxy controller 110 may subtract the list of the registered storage devices from a list of all active storage devices (e.g., from the responses received from the storage devices 220), thereby generating a list of the NCS devices in the storage network.

Referring again to FIG. 4, instruction 440 may be executed to register the second subset of the plurality of storage devices on the central controller of the storage network. For example, referring to FIG. 2, at block 250, the proxy controller 110 may request registration with the central controller 130 as a storage device that includes the NCS devices as subsystems. At block 260, the central controller 130 may register the proxy controller 110 as a storage device. At block 270, the central controller 130 may configure the NCS devices as subsystems of the proxy controller 110. For example, in implementations in which the central controller 130 is a CDC, the proxy controller 110 registers itself with the CDC as a proxy storage device (or a discovery controller of a storage device) that includes the NCS devices as components or subsystems. Subsequently, the CDC may configure or manage the NCS devices (e.g., for auto discovery, name services, zoning, fabric notifications, and so forth).

Figure 5:
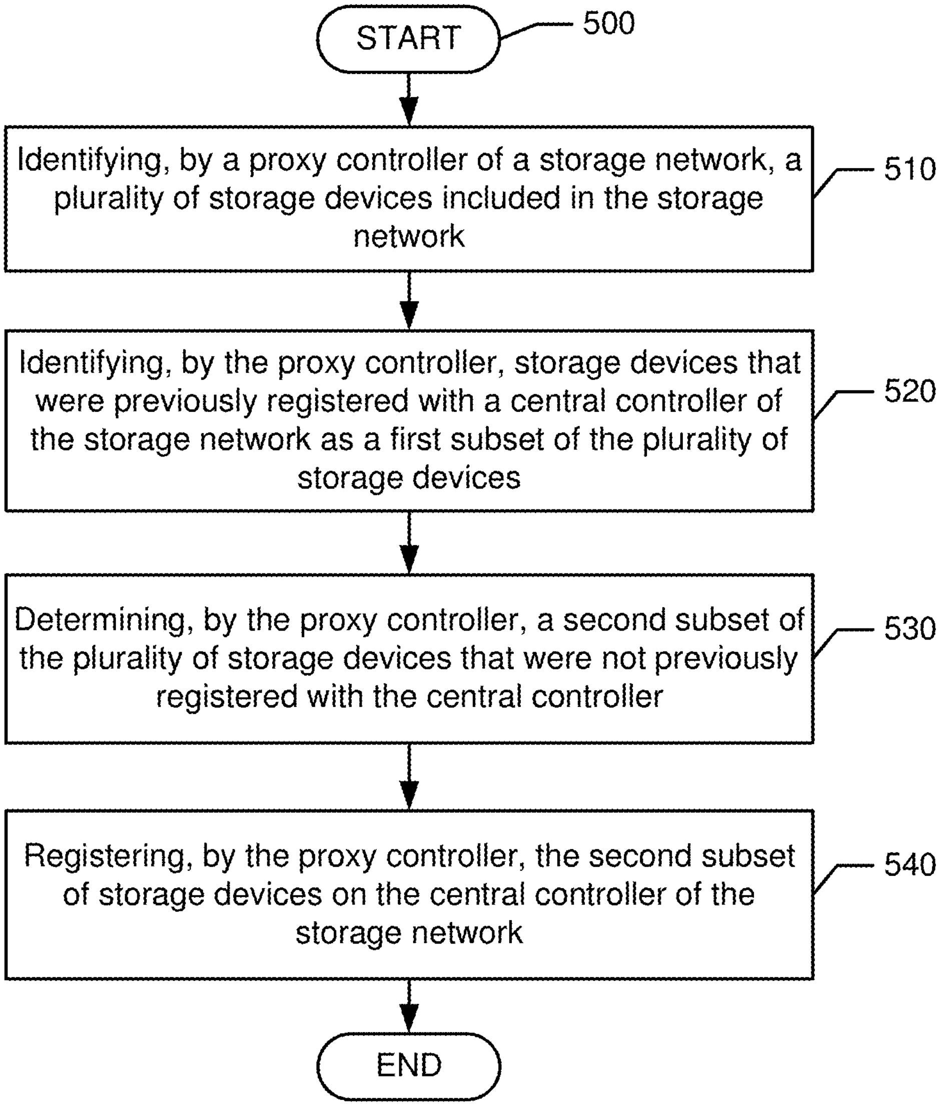
FIG. 5 is an illustration of an example process, in accordance with some implementations.

FIG. 5—Example Process

FIG. 5 shows an example process 500, in accordance with some implementations. In some examples, the process 500 may be performed using a proxy controller 110 (shown in FIGS. 1A and 1C). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. However, other implementations are also possible.

Block 510 may include identifying, by a proxy controller of a storage network, a plurality of storage devices included in the storage network. Block 520 may include identifying, by the proxy controller, storage devices that were previously registered with a central controller of the storage network as a first subset of the plurality of storage devices.

Block 530 may include determining, by the proxy controller, a second subset of the plurality of storage devices that were not previously registered with the central controller. Block 540 may include registering, by the proxy controller, the second subset of the plurality of storage device on the central controller of the storage network. Blocks 510-540 may correspond generally to the examples described above with reference to instructions 410-440 (shown in FIG. 4).

Figure 6:
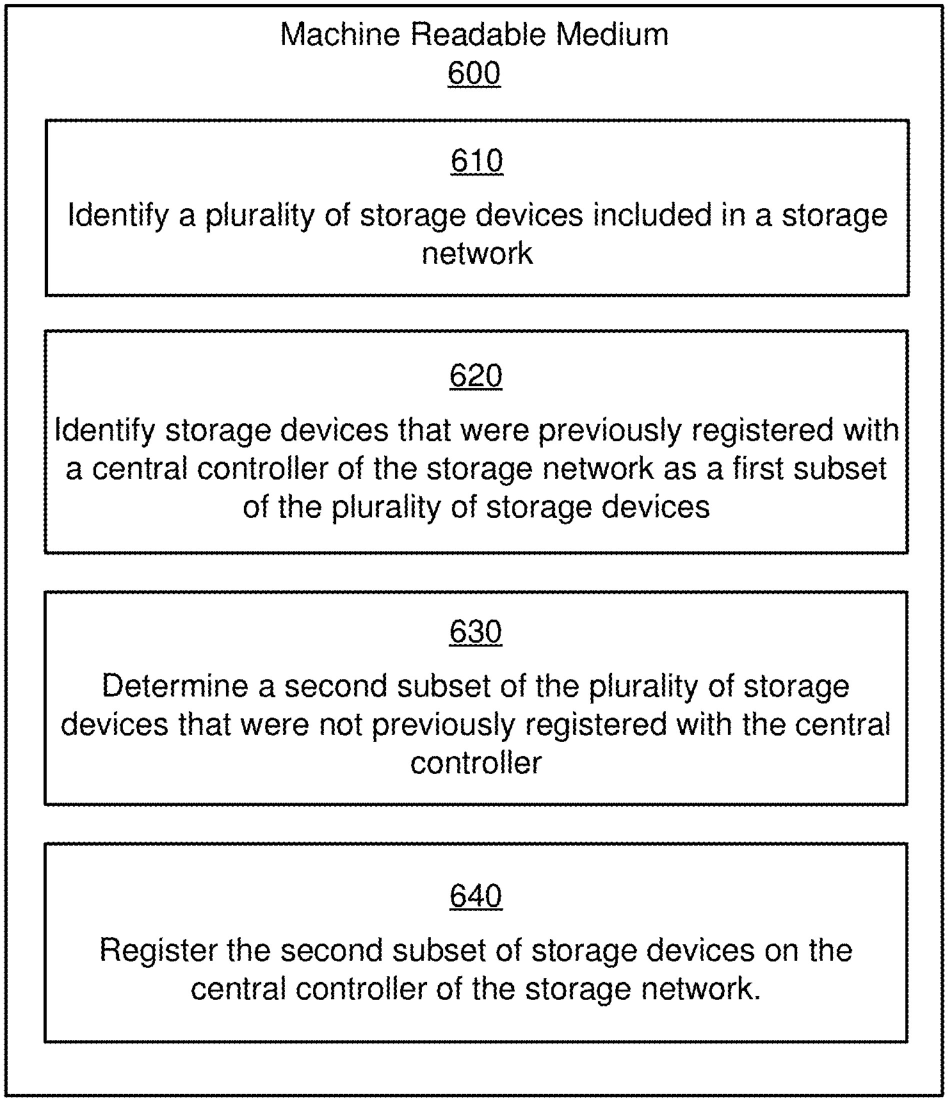
FIG. 6 is a diagram of an example machine-readable medium storing instructions in accordance with some implementations.

FIG. 6—Example Machine-Readable Medium

FIG. 6 shows a machine-readable medium 600 storing instructions 610-640, in accordance with some implementations. The instructions 610-640 can be executed by a single processor, multiple processors, a single processing engine, multiple processing engines, and so forth. The machine-readable medium 600 may be a non-transitory storage medium, such as an optical, semiconductor, or magnetic storage medium. The instructions 610-640 may correspond generally to the examples described above with reference to instructions 410-440 (shown in FIG. 4).

Instruction 610 may be executed by a controller to identify a plurality of storage devices included in a storage network. Instruction 620 may be executed by the controller to identify storage devices that were previously registered with a central controller of the storage network as a first subset of the plurality of storage devices.

Instruction 630 may be executed by the controller to determine a second subset of the plurality of storage devices that were not previously registered with the central controller. Instruction 640 may be executed by the controller to register the second subset of the plurality of storage device on the central controller of the storage network.

CONCLUSION

In accordance with some implementations described herein, a proxy controller may automatically discover non-compliant network devices in a storage network system, and may allow a central controller to perform management tasks using the discovered non-compliant devices. The proxy controller may query the central controller to obtain a list of all registered storage devices (i.e., storage devices that were previously registered with the central controller). The proxy controller may also perform a poll or scan to identify all storage devices present in the storage network, and may then identify the non-compliant storage devices as the subset of the storage devices that were not previously registered with the central controller. The proxy controller may collect configuration information from the non-compliant storage devices. Further, the proxy controller may register itself with the central controller as a single network device that appears to include the non-compliant storage devices (e.g., as components or subsystems of the proxy controller). The non-compliant storage devices may then be included in the configurations generated by the central controller. In this manner, the proxy controller may automatically discover and configure the non-compliant storage devices in the storage network system.

Note that, while FIGS. 1A-6 show various examples, implementations are not limited in this regard. For example, referring to FIG. 1A, it is contemplated that the network system 100 may include additional devices and/or components, fewer components, different components, different arrangements, and so forth. In another example, it is contemplated that the functionality of the proxy controller 110 described above may be included in any another engine or software of the network system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In the present disclosure, use of the term "a," "an," or "the" is intended to include the plural forms as well, unless the context clearly indicates otherwise. Also, the term "includes," "including," "comprises," "comprising,"

"have," or "having" when used in this disclosure specifies the presence of the stated elements, but do not preclude the presence or addition of other elements.

What is claimed is:

1. A computing device comprising:

a processor; and a machine-readable storage storing instructions that, when executed by the processor, cause the processor to:

identify a plurality of storage devices included in a storage network;

identify storage devices that were previously registered with a central controller of the storage network as a first subset of the plurality of storage devices;

determine, from among the plurality of storage devices in the storage network, a second subset of storage devices based on the identified first subset, wherein the second subset of storage devices were not previously registered with the central controller;

register, on the central controller of the storage network, the computing device as a proxy storage device; and register, on the central controller of the storage network, the second subset of storage devices as subsystems of the proxy storage device.

2. The computing device of claim 1, wherein the second subset of storage devices is an initial set of non-compliant storage (NCS) devices included in the storage network.

3. The computing device of claim 2, including instructions that, when executed by the processor, cause the processor to, subsequent to registering the second subset of storage devices on the central controller:

determine an updated set of NCS devices included in the storage network;

determine changes between the initial and updated sets of NCS devices; and request a modified registration of the proxy storage device based on the determined changes between the initial and updated sets of NCS devices.

4. The computing device of claim 2, including instructions that, when executed by the processor, cause the processor to, subsequent to registering the second subset of storage devices on the central controller:

send a periodic packet to the central controller, wherein the central controller is to, in response to a receipt of the periodic packet, maintain the proxy storage device and the initial set of NCS devices as registered on the central controller.

5. The computing device of claim 1, including instructions that, when executed by the processor, cause the processor to:

identify the plurality of storage devices based on a scan for each storage device that has an active port on the storage network;

issue a query request to the central controller to identify the first subset; and determine the second subset of storage devices by subtracting the identified first subset from the plurality of storage devices.

6. The computing device of claim 1, including instructions that, when executed by the processor, cause the processor to, subsequent to determining the second subset of storage devices:

send, to the second subset of storage devices, query requests for configuration information of the second subset of storage devices; and register the second subset of storage devices on the central controller based at least on the configuration information of the second subset of storage devices.

7. The computing device of claim 1, wherein the second subset of storage devices are configured by central controller after being registered on the central controller.

8. The computing device of claim 1, wherein the central controller is a central discovery controller (CDC) of the storage network.

9. A method comprising:

identifying, by a proxy controller of a storage network, a plurality of storage devices included in the storage network;

identifying, by the proxy controller, storage devices that were previously registered with a central controller of the storage network as a first subset of the plurality of storage devices;

the proxy controller determining, from among the plurality of storage devices in the storage network, a second subset of storage devices based on the identified first subset, wherein the second subset of storage devices were not previously registered with the central controller;

the proxy controller registering the proxy controller as a proxy storage device on the central controller of the storage network; and the proxy controller registering, on the central controller of the storage network, the second subset of storage devices as subsystems of the proxy storage device.

10. The method of claim 9, comprising, subsequent to registering the second subset on the central controller:

configuring, by the central controller, the registered second subset of storage devices.

11. The method of claim 9, wherein the second subset of storage devices is an initial set of non-compliant storage (NCS) devices included in the storage network.

12. The method of claim 11, comprising, subsequent to registering the second subset of storage devices on the central controller:

determining, by the proxy controller, an updated set of NCS devices included in the storage network;

determining, by the proxy controller, changes between the initial and updated sets of NCS devices; and requesting, by the proxy controller, a modified registration of the proxy controller based on the determined changes between the initial and updated sets of NCS devices.

13. The method of claim 11, comprising, subsequent to registering the second subset of storage devices on the central controller:

sending, by the proxy controller, a periodic packet to the central controller; and in response to a receipt of the periodic packet, maintaining, by the central controller, the proxy controller and the initial set as registered on the central controller.

14. The method of claim 9, comprising:

identifying, by the proxy controller, the plurality of storage devices based on a scan for each storage device that has an active port on the storage network;

sending, by the proxy controller, a query request to the central controller to obtain a list of the first subset; and the proxy controller, the second subset of storage devices by subtracting the first subset from the plurality of storage devices.

15. A non-transitory machine-readable medium storing instructions that upon execution cause a controller to:

identify a plurality of storage devices included in a storage network;

identify storage devices that were previously registered with a central controller of the storage network as a first subset of the plurality of storage devices;

determine, from among the plurality of storage devices in the storage network, a second subset of storage devices based on the identified first subset, wherein the second subset of storage devices were not previously registered with the central controller;

register, on the central controller of the storage network, the computing device as a proxy storage device; and register, on the central controller of the storage network, the second subset of storage devices as subsystems of the proxy storage device.

16. The non-transitory machine-readable medium of claim 15, wherein the second subset of storage devices is an initial set of non-compliant storage (NCS) devices included in the storage network.

17. The non-transitory machine-readable medium of claim 16, including instructions that upon execution cause the controller to, subsequent to registering the second subset of storage devices on the central controller:

determine an updated set of NCS devices included in the storage network;

determine changes between the initial and updated sets of NCS devices; and request a modified registration of the proxy storage device based on the determined changes between the initial and updated sets of NCS devices.

18. The non-transitory machine-readable medium of claim 16, including instructions that upon execution cause the controller to, subsequent to registering the second subset of storage devices on the central controller:

send a periodic packet to the central controller, wherein the central controller is to, in response to a receipt of the periodic packet, maintain the proxy storage device and the initial set of NCS devices as registered on the central controller.

19. The non-transitory machine-readable medium of claim 15, including instructions that upon execution cause the controller to:

identify the plurality of storage devices based on a scan for each storage device that has an active port on the storage network;

issue a query request to the central controller to identify the first subset; and determine the second subset of storage devices by subtracting the identified first subset from the plurality of storage devices.

20. The non-transitory machine-readable medium of claim 15, including instructions that upon execution cause the controller to, subsequent to determining the second subset of storage devices:

send, to the second subset of storage devices, query requests for configuration information of the second subset of storage devices; and register the second subset of storage devices on the central controller based at least on the configuration information of the second subset of storage devices.

* * * * *